United States Patent [19]
Jenkins et al.

[11] Patent Number: 5,154,737
[45] Date of Patent: Oct. 13, 1992

[54] SYSTEM FOR ELIMINATING AIR LEAKAGE AND HIGH PURITY OXYGEN OF A PSA OXYGEN CONCENTRATOR

[75] Inventors: Charles E. Jenkins, New Albany, Ind.; Raymond A. Stanford, Rock Island, Ill.

[73] Assignee: VBM Corporation, Louisville, Ky.

[21] Appl. No.: 690,691

[22] Filed: Apr. 24, 1991

Related U.S. Application Data

[63] Continuation-in-part of Ser. No. 674,789, Mar. 25, 1991, and Ser. No. 675,445, Mar. 26, 1991, each is a continuation-in-part of Ser. No. 464,244, Jan. 12, 1990, Pat. No. 5,002,591.

[51] Int. Cl.$^5$ .......................................... B01D 53/04
[52] U.S. Cl. .................................. 55/26; 55/62; 55/68; 55/74; 55/75; 55/162; 55/163; 55/179; 55/387; 55/389
[58] Field of Search ................. 55/25, 26, 58, 62, 68, 55/74, 75, 161–163, 179, 189, 387, 389

[56] References Cited

U.S. PATENT DOCUMENTS

| | | | |
|---|---|---|---|
| 4,331,455 | 5/1982 | Sato | 55/62 X |
| 4,415,340 | 11/1983 | Knoblauch et al. | 55/25 |
| 4,449,990 | 5/1984 | Tedford, Jr. | 55/68 X |
| 4,552,571 | 11/1985 | Dechene | 55/68 X |
| 4,561,287 | 12/1985 | Rowland | 55/21 X |
| 4,566,881 | 1/1986 | Richter et al. | 55/62 X |
| 4,636,226 | 1/1987 | Canfora | 55/68 |
| 4,648,888 | 3/1987 | Rowland | 55/25 |
| 4,661,125 | 4/1987 | Haruna et al. | 55/62 X |
| 4,673,415 | 6/1987 | Stanford | 55/68 X |
| 4,684,377 | 8/1987 | Haruna et al. | 55/62 X |
| 4,813,979 | 3/1989 | Miller et al. | 55/25 |
| 4,917,710 | 4/1990 | Haruna et al. | 55/62 X |
| 4,973,339 | 11/1990 | Bansal | 55/62 X |
| 5,002,591 | 3/1991 | Stanford | 55/62 X |

Primary Examiner—Robert Spitzer
Attorney, Agent, or Firm—Fay, Sharpe, Beall, Fagan, Minnich & McKee

[57] ABSTRACT

A first compressor (10) supplies air under pressure to a first stage pressure swing adsorption system (D) which separates oxygen and argon from atmospheric air. A second stage pressure swing adsorption system (E) separates the oxygen from the argon. Each time the compressor (10) is shut off, pressure in molecular sieve beds (22a, 22b) and (90a, 90b) tend to equalize causing mixing of retained primary product gas a feed stock gas. When the compressor (10) is restarted, the intermixed gas is supplied with the primary product gas for the first few cycles. During the first few cycles, a diverter valve (130) diverts the primary product gas to a vent (132) such that the reduced purity primary product gas is not supplied downstream. Thereafter, primary product gas is drawn into a suction tank (110) which is maintained at a reduced pressure by a second compressor (112). A second compressor (112) is a piston type compressor that compresses gas by reciprocating movement of the piston (150) and a cylinder (152) draws primary product gas in on a suction stroke and compresses it on a compression stroke. During the suction stroke, gas tends to be drawn between the piston and the cylinder from a crankcase (158). Primary product gas is fed by a line (162) into the crankcase to maintain the crankcase charged with the primary product gas. In this manner, any primary product gas which leaks between the piston and the cylinder is primary product gas and does not dilute the primary product gas which is compressed and supplied downstream by the compressor.

17 Claims, 5 Drawing Sheets

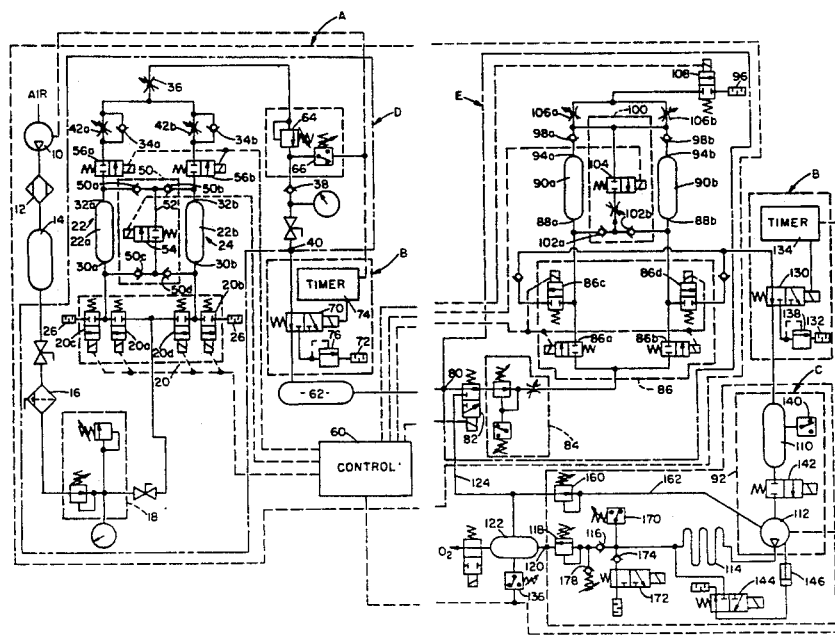

SYSTEM FOR ELIMINATING AIR LEAKAGE AND HIGH PURITY OXYGEN OF A PSA OXYGEN CONCENTRATOR

The present application is a continuation-in-part of U.S. application Ser. No. 674,789, filed Mar. 25, 1991 and U.S. application Ser. No. 675,445, filed Mar. 26, 1991, both of which are continuations-in-part of U.S. application Ser. No. 464,244, filed Jan. 12, 1990, now U.S. Pat. No. 5,002,591.

BACKGROUND OF THE INVENTION

The present application relates to the art of gas separation. It finds particular application in conjunction with pressure swing adsorption oxygen concentrators for separating oxygen from atmospheric air and will be described with particular reference thereto. However, it is to be appreciated that the present invention is applicable to the purification and separation of other gases.

Heretofore, oxygen has been separated from atmospheric air by selective adsorption. Atmospheric air was cyclically pumped into one of a pair of beds filled with a physical separation material. The physical separation material permitted the less strongly adsorbed molecules to pass therethrough while trapping or retaining the more strongly adsorbed molecules. A 5A zeolite material passes oxygen and argon but adsorbs nitrogen, carbon dioxide, and water vapor. Other physical separation materials adsorb oxygen and pass nitrogen and argon, and other combinations of gases. When the trapping or adsorption capacity of the bed was substantially met, i.e. the bed was substantially saturated, the air was pumped to the second bed while the first bed was evacuated or cleansed of adsorbed molecules.

Commonly, gases were transferred between the beds. For example, a pressure equalization valve might be operated to equalize the pressure between the beds to conserve the energy in the compressed gases. Commonly, while the saturated bed is being evacuated of adsorbed material, a small amount of primary product gas, e.g. oxygen, from the other bed is fed back through check valves and restrictors.

The oxygen or other separated gas(es) were stored in a primary product gas reservoir. More specifically, a second compressor commonly increased the pressure of the primary product gas and stored it in the primary product gas reservoir. When the reservoir was filled to a preselected pressure, separation of oxygen or other primary product gas was stopped.

One of the problems with the prior art is that while the system was stopped, a small amount of leakage inherent in most commonly available valves allowed the beds to come into pressure equilibrium. The pressure equilibrium was usually at least in part attributable to air and adsorbed secondary product gases equalizing themselves in the two beds. When the primary product reservoir became low and the separator was restarted, the air and secondary product gases from one of the beds would be supplied as primary product gas during the initial fractional cycle portion. In practice, the output primary product gas tended to be below optimum purity for the first full cycle or two. Yet, this less than optimally pure primary product gas was supplied to the primary product reservoir reducing the purity of the gas therein.

Another problem in the prior art resided in the second compressor for compressing the relative low pressure primary product gas from the molecular sieve beds to the high pressure of the primary product storage tank. In large volume or high pressure applications, the second compressor is normally a piston-type compressor or pump. Diaphragm compressors or pumps are normally only available for low volume and low pressure applications. In a piston-type compressor, the piston draws primary product gas in during the downstroke. The reduction in pressure caused by the downstroke also causes some leakage between the cylinder and the bore. More specifically, the negative pressure draws air from the crankcase of the second compressor around the piston and into the primary product gas. This compressor leakage again reduces the purity of the primary product gas.

The present invention contemplates a new and improved gas separation system and primary product gas delivery system which overcomes the above-referenced problems and others.

SUMMARY OF THE INVENTION

In accordance with a first aspect of the present invention, a pressure swing adsorption gas separation system is provided. The system includes a compressor for supplying gas to molecular sieve beds, which compressor is operated when necessary to meet downstream demand. A means is provided for diverting primary product gas from being supplied downstream each time the system is restarted or recycled. In this manner, impure primary product gas generated at initial start up is not supplied downstream.

In accordance with a more limited aspect of the present invention, a diverter valve is provided for venting the primary product gas to the atmosphere. A timer holds the diverter valve open for a preselected duration each time the system is recycled or restarted, e.g. two complete cycles of the beds.

In accordance with another aspect of the present invention, the primary product gas is fed to a piston-type compressor which raises its pressure before supplying it downstream. Previously separated primary product gas is fed back to the crankcase of the piston pump such that any gas drawn out of the crankcase between the piston and the cylinder is the primary product gas.

One advantage of the present invention is that it improves the purity of the primary product gas conveyed to downstream equipment.

Another advantage of the present invention is that it facilitates cycling of the compressors without loss of product purity.

Still further advantages will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

BRIEF DESCRIPTION OF THE PREFERRED EMBODIMENT

Figure 1A:
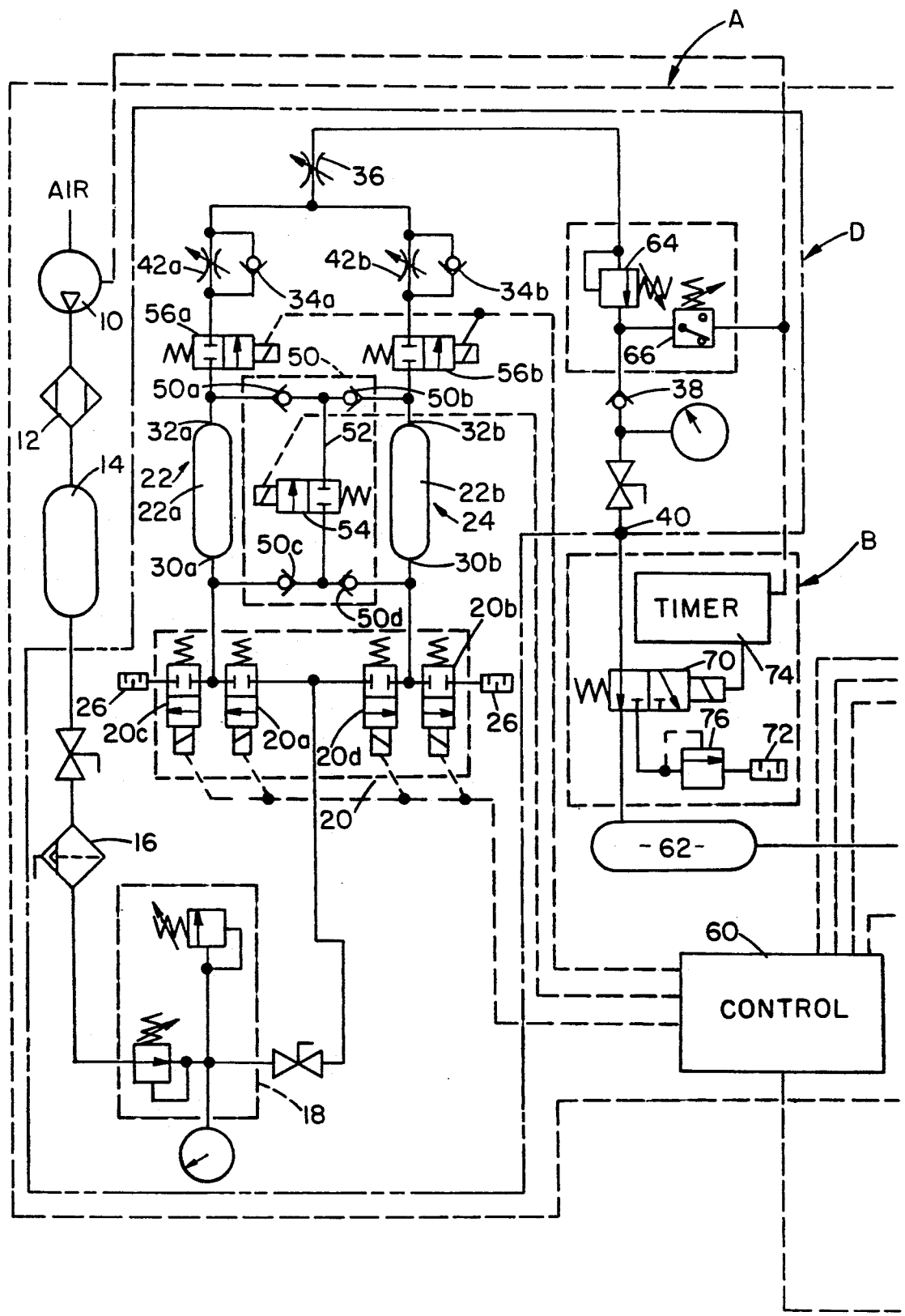
FIGS. 1A and 1B taken together are a diagrammatic illustration of a pressure swing adsorption system in accordance with the present invention.
Figure 1B:
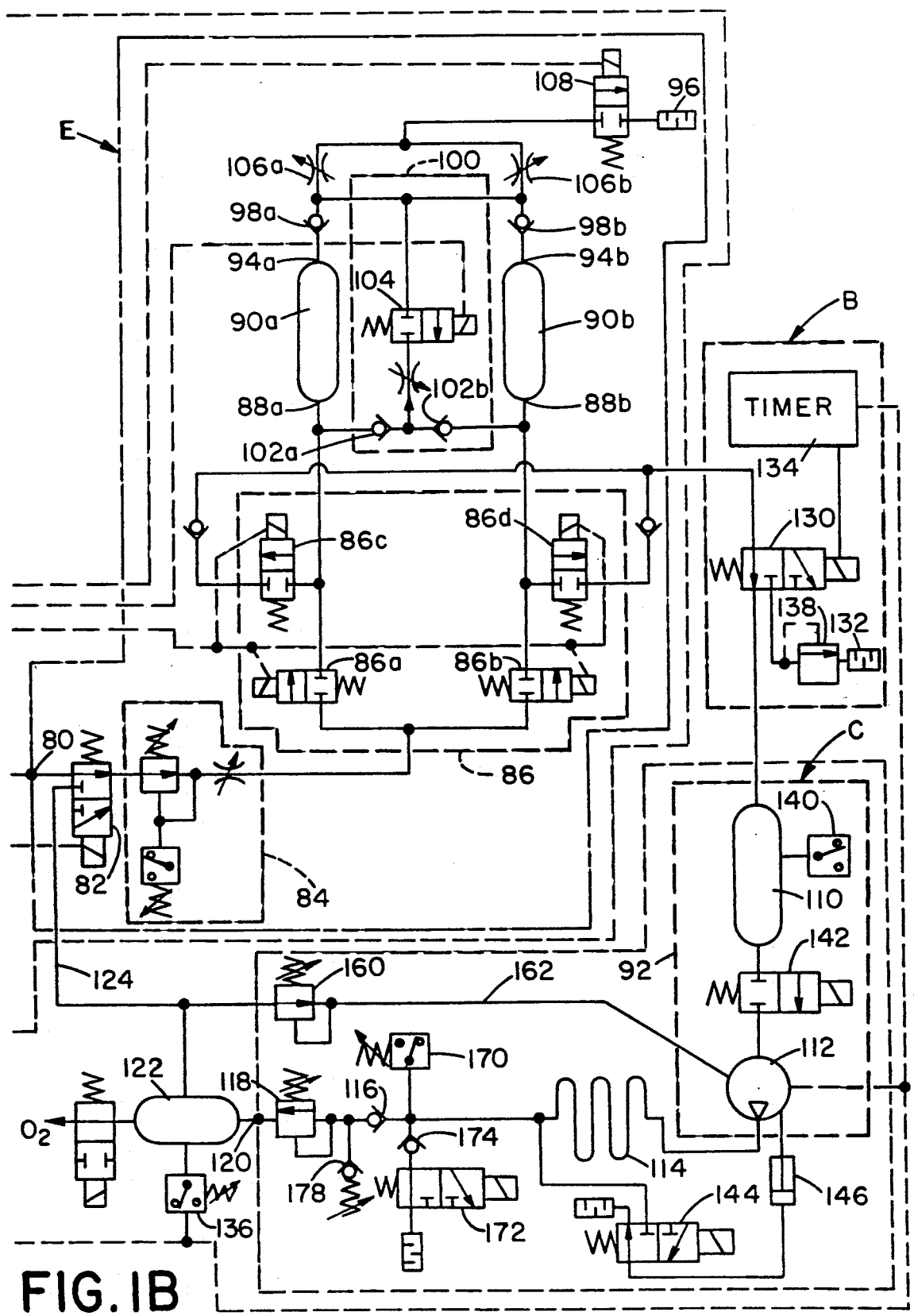

With reference to FIGS. 1A and 1B, the separation stage A separates a primary product gas from a gaseous mixture. In the preferred embodiment, the primary product gas is oxygen that is separated from atmospheric air. Primary product gas from the separator A is connected to an initial product dispersal means B which discharges primary product gas for a selectable duration after the initiation of gas separation before allowing the primary product gas to be supplied downstream. A pressure boosting means C selectively boosts the pressure of primary product gas which is fed downstream.

More specifically to the preferred embodiment, the gas separating means includes a first separation stage D which separates an oxygen-argon primary product gas from atmospheric air. Nitrogen, carbon dioxide, water vapor, and the like are discharged as a secondary product gas. The primary product gas, which is not adsorbed by the first stage, is channeled to a second stage E. Alternately, the primary product gas from the first stage can be connected to the initial product dispersal means B and the primary product pressurizing means C directly.

If purer, argon-free oxygen is desired, a second stage E may be provided for separating substantially pure oxygen primary product gas from the oxygen-argon feed stock. Alternately, argon may be the primary product gas which is conveyed to the initial product dispersal circuit B and the pressure increasing means C. In the second stage, the primary product oxygen is adsorbed and secondary product argon gas passes unadsorbed. As yet another alternative, the first stage D may be eliminated and the air may be passed directly to the second stage E.

A first compressor 10 selectively supplies air under pressure to a coalescing filter 12 removes any oil, particulates, or other contaminants from the compressed air. The compressed air is stored in a compressed air receiver tank 14. A dryer 16 removes water vapor from the compressed air. A pressure regulation means 18 includes a pressure limiting valve and a safety relief valve for limiting the pressure supplied to the molecular sieve beds.

A cross over valve assembly 20 alternately channels the compressed air to each of molecular sieve beds 22a, 22b connects the other molecular sieve bed with one of exhaust ports 26. Exhaust ports 26 may be connected with an inlet of a vacuum pump or vented to atmosphere. The cross over valve assembly 20 has three states. In a first state, a valve assembly 20a is open such that the first molecular sieve bed 22a receives the gaseous mixture under pressure from the compressor. A second valve 20b is also open such that the second molecular sieve bed 22b is connected with the exhaust ports 26. Valves 20c and 20d are closed. In a second state, valves 20c and 20d are open and valves 20a and 20b are closed. In this manner, the second bed 22b receives the air under pressure from the compressor and the first bed 22a is connected with the exhaust ports. In a third state, all four valves portion 20a–20d are closed.

The first sieve bed 21a has a lower or input end 30a which is connected to the cross over valve assembly 20 and an upper or output end 32a through which oxygen or other primary product gas is discharged. The second sieve bed 22b analogously has a lower or input end 30b connected to the cross over valve assembly and an upper or output end 32b through which the primary product gas is discharged. A first check valve 34a permits the primary product gas from the first sieve bed to be channelled through a restrictor valve 36 and a check valve 38 to a primary product output port 40. A feedback restrictor 42b permits a small portion of the primary product gas from the first bed to be fed back into the output end 32b of the second bed. Analogously, a second check valve 34b permits the primary product gas from the second bed to be channelled to the output port 40 and a feedback restrictor valve 42a permits a small fraction of the second bed output to be fed back to the output end 32a of the first sieve bed.

A pressure equalization valving means 50 selectively interconnects the output end of one bed with the input end of the other. More specifically, a set of check valves 50a, 50b, 50c, and 50d permit gas to flow from the output end of the pressurized bed through a downcomer line 52 to the input end of a purged or evacuated bed when a pressure equalization valve 54 is open. The pressure equalization valve 54 is disposed at the lower most end of the downcomer line 52 immediately contiguous to check valves 50c and 50d. The check valves permit unidirectional flow between the inlet or outlets of the beds and the downcomer line. A product gas valving means, including valves 56a and 56b, selectively disconnects the outlet ends of the beds from the outlet port 40 and from each other. It is to be understood that line 52 is diagrammatically referred to as a "downcomer" line and does not necessarily imply a vertical orientation in any physical embodiment of this invention.

More specifically, a first T-connection interconnects the first bed output end 32a, check valve 50a and the check valve-feedback restrictor assembly 34a, 42a. A second T-connection interconnects with the second bed output end 32b, the check valve 50b, and the feedback-check valve arrangement 34b, 42b. The T-connections include first legs, respectively, that are connected with the first and second bed output ends, respectively. The T-connections have second legs, that are interconnected directly with the feedback means 42a, 42b, respectively. The T-connections have third legs, which are connected directly with first and second check valves 50a, 50b, respectively, which are connected directly to a first or uppermost end of the downcomer line 52. In this manner, the T-connection third legs define gas reservoirs or regions that are of minimal volume, which third leg volume is much smaller than the volume defined by the downcomer line between the uppermost end and the equalization valve 54.

Figure 2:
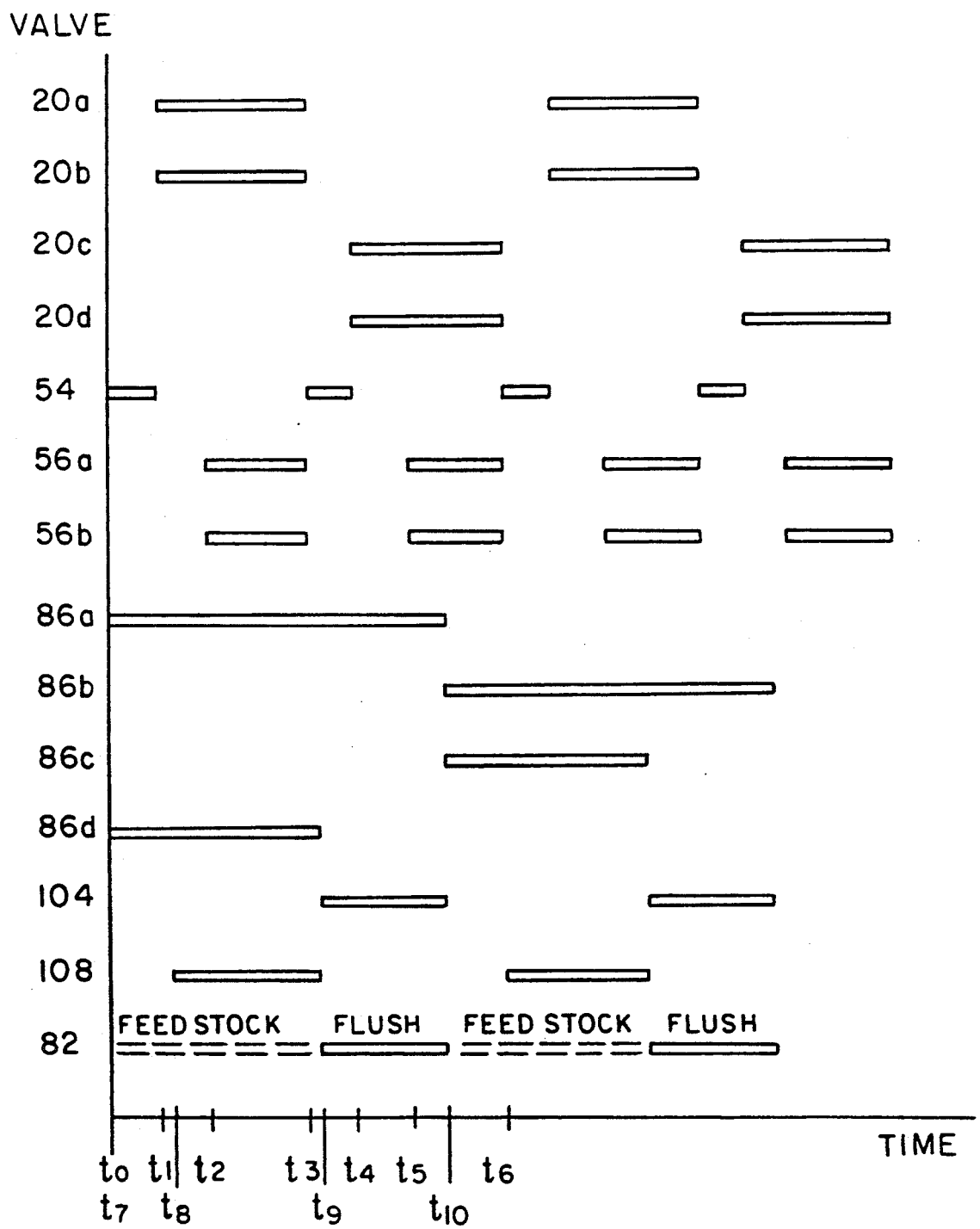
FIG. 2 is a timing diagram for valves of the system of FIG. 1.

With continuing reference to FIG. 1, and further reference to FIG. 2, at an arbitrary time $t_0$, the second bed 22b is fully pressurized and approaching breakthrough. At $t_0$, the cross over valve assembly 20 enters the third state, i.e. valves 20c and 20d are closed causing all of valves 20a–20d to be closed. This stops further pressurization of the second bed 22b and prevents further exhausting of the first bed 22a. The pressure equalization valve 54 is opened such that output product gas from the output end 32b of the second bed flows through check valve 50b, pressure equalization valve 54, and check valve 50c to the inlet end 30a of the previously exhausted first bed 22a. Valves 56a and 56b are also closed at t to prevent any gas from flowing to the outlet port 40 or between outlet ends 32a and 32b of the two beds.

The pressure in the second bed 22b begins to drop from full pressurization as the pressure in the first bed 22a begins to rise from its minimum pressure. The pressure in the downcomer line is between the pressures of the two beds. The concentration of oxygen flowing from the second bed outlet end 32b to the inlet end 30a of the first bed begins to drop off rapidly as breakthrough occurs in the second bed. The decrease in pressure in the second bed 22b during pressure equalization permits some of the adsorbed nitrogen to be released. This causes the tail end of the equalization period to produce a greater concentration of nitrogen than the natural nitrogen concentration of atmospheric air.

When the first and second beds are substantially in equilibrium at time $t_1$ the pressure equalization period is terminated. The equalization period is terminated by closing equalization valve 54 and changing the cross over valve assembly 20 to its first state in which valves 20a and 20b are opened. After pressure equalization valve 54 closes, the check valves 50a and 50b permit gas at a higher pressure than the downcomer line to pass into the downcomer line until these pressures equalize. The change in states of valve assembly 20 may be triggered by a valve timing control means 60, an oxygen concentration sensor or by a pressure sensor in the downcomer line.

At time $t_:$, the first and second beds have come into substantial pressure equilibrium. The contaminated primary product gas with the least oxygen or most nitrogen is retained in the first and third legs, of the second T-connection. The gas with the next most nitrogen or least oxygen is retained in the downcomer tube 52. The downcomer tube, the legs of the second T-connection and other portions of the path through which this gas has flowed are, of course, at the same pressure.

The equalization valve 54 may be closed earlier than pressure equalizations between beds 22a and 22b to allow only the most oxygen rich gas to be transferred at the cost of full pressure equalization. As yet another option, the cross over valve may continue to supply air to the pressurized bed after the equalization valve is open. This may be particularly advantageous if the adsorbed nitrogen is also a product gas which is recovered from the exhaust port 26.

Atmospheric air from the compressor 10 is pumped into the first bed 26a to increase its pressure as the second bed 22b is purged through the exhaust port 26. The product valves 56a and 56b may open at $t_1$ or may remain closed for a short duration after $t_1$ until a time $t_2$.

After the primary product valves 56a, 56b are opened at $t_2$, primary product gas is fed back through restrictor 42b, through the first and second legs, of the second T-connector, and into the second bed 22b in which pressure is continuing to decrease. This draws the heavily nitrogen contaminated gas that was discharged just before $t_1$ from the first and second legs of the second T-connector. Although some of the contaminated gas is drawn from the third leg, as the pressure rises, the heavily contaminated gas in the third leg is pushed toward the check valve 50b by oxygen-rich primary product gas that is fedback through restrictor 42b.

When the pressure in the second T-connection exceeds the pressure in the downcomer line 52 during repressurization, the check valve 50b opens, allowing the contaminated gas to be pushed into the downcomer line. Because, within practicality, the volume of the third leg is minimal relative to the downcomer line, a small amount of primary product gas may also pass through the check valve 50b to equalize the pressure in the downcomer line with the pressure at the output of the second bed. It should be noted that the displacement of low purity gas away from where it could contaminate the product stream is facilitated by the use specifically of check valves, since controlled valves would not allow any spontaneous passing of gas on a rise of pressure.

Just before the breakthrough occurs at the first bed at a time $t_3$ the cross over valve is moved to its third state, the pressure equalization valve 54 is opened, and the product valves 56a and 56b are closed. Product gas then flows from the outlet end 32a of the first sieve bed through check valve 50a, the pressure equalization valve 54 and check valve 50d to the inlet end 30b of the second bed. When substantial equilibrium is reached at $t_4$, the equalization valve 54 is closed and the cross over valve assembly 20 is moved to its second state. A short time later, $t_5$, the product valves 56a and 56b are opened and oxygen product gas is delivered to the outlet port 40. At time $t_6$, the cycle repeats.

Analogously, heavily contaminated gas from the end of the equalization cycle in which pressure from the first bed 22a is passed to the second bed 22b leaves a small amount of heavily contaminated gas in the first T-connection. The contaminated gas in the first and second legs, is pushed back into the first bed by gas fed back through the restrictor valve 42a as the first bed is being purged. The pressure increase of further purging to a pressure greater than the equilibrium pressure in the downcomer line 52 causes the remainder of the heavily contaminated gas that is trapped in the third leg to be pushed toward or through check valve 50a into the downcomer line. If any nitrogen contaminated gas in the third leg does not get pushed through the check valve by the feedback gas, it will be pushed through at the start of the next oxygen output cycle before it can be carried to the primary product port.

It will be noted that placing the pressure equalization control valve 54 at the lowermost practical point of the downcomer line maximizes its useful volume which minimizes blow down and wastage of clean breakthrough gas at exhaust and facilitates receipt of the heavily contaminated breakthrough gas from the third leg of the T-connections. The use of check valves 50a, 50b assures that the downcomer line and the output of the primary product gas producing bed do not become interconnected until the primary product gas pressure exceeds the downcoming line pressure. This is important for certain control cycle schemes in which these valves experience actuation or deactivation delays, as controlled valves might, when the downcomer line has a higher pressure than the primary product gas. The delays allow heavily contaminated breakthrough gas to be pushed from the downcomer line into the primary product gas. The use of check valves eliminates any timing delays that are inherent in controlled valves to assure that this reverse flow of contaminated breakthrough gas does not occur.

With reference again to FIGS. 1A and 1B, a surge tank 62 stores a supply of the roughly 95% oxygen, 5% argon mixture at the output of the first stage D and the input to the second stage E. The feed stock in the surge tank is at an elevated pressure, albeit at a lower pressure than the input pressure to the first stage. A backpressure maintaining valve 64 maintains a minimum backpressure on the first stage D. A pressure sensor switch 66 senses pressure in tank 62. When a preselected pressure is reached indicating that the tank is full, switch 66 shuts down the first stage. The second stage may run independently of the first stage. The initial product dispersal means B includes a valve means 70 for selectively diverting the outlet gas of the first stage D to the surge tank 62 or to an exhaust port 72. The valve 70 is a relay controlled valve whose coil is controlled by a timer 74. The timer is connected with the valve 66 such that it is reset each time the first stage is restarted, i.e. the pressure in the tank 62 reaches the shut off pressure and subsequently drops to the restart point. The timer causes the valve 70 to change states such that primary product gas is directed to the outlet 72 until the timer 74 times out. In the preferred embodiment, the timer 74 is set for two complete cycles of the first stage. Alternately, the timer may be a counter which counts changes of state of the valve means 20 to measure a number of cycles performed. As yet another alternative, the diverter valve means 70 may be controlled by a primary product purity sensor disposed upstream from the valve 70. A pressure regulator valve 76 remains closed until the pressure of primary product gas generated by the separator A reaches a preselected minimum. The preselected minimum is higher than atmospheric pressure. In this manner, the pressure regulator valve 76 maintains a selected backpressure and assures unidirectional flow through outlet 72. Atmospheric air is prevented from being drawn into the system through diverter valve 70.

The second stage E has an inlet port 80 which receives its feed stock from the surge tank 70. In the first portion of the cycle, a flush valve 82 connects the oxygen-argon feed stock mixture from the first stage through a pressure regulation system 84 to a valve assembly 86. The pressure regulation means 84 regulates the pressure to a preselected pressure and flow rate for which other system parameters have been optimized.

The valve assembly 86 includes valves 86a and 86b for selectively connecting first ends 88a and 88b of molecular sieve beds 90a and 90b with the feed stock mixture. The valve assembly also includes valves 86c and 86d for selectively connecting the first ends of the first and second beds, respectively, with a low pressure means 92 for selectively withdrawing adsorbed oxygen from the molecular sieve beds. In the preferred embodiment, the molecular sieve beds contain a material which adsorbs oxygen and which passes argon and nitrogen, such as activated carbon or 4A zeolite.

The first and second beds have second ends 94a, 94b through which the first and second beds are connected with an argon output port 96. Check valves 98a and 98b assure unidirectional flow of secondary product and breakthrough feed stock gas from the bed second ends.

A transfer means 100 selectively connects the first and second beds in series. Check valves 98a and 98b along with check valves 102a and 102b automatically connect the beds in series such that the bed under higher pressure is connected upstream from the bed at lower pressure. A primary product conservation or transfer valve 104 is opened and closed to connect the beds in series.

Restrictors 106a and 106b along with an argon or secondary product valve 108 selectively control the flow of argon or other secondary product gas to the secondary product port 96.

The low pressure means 92 includes a low pressure tank 110 which is held a low, preferably positive, pressure by a second vacuum pump or compressor 112. The compressor 112 supplies primary product gas at a higher pressure to a heat exchanger 114 which removes the heat added to the primary product gas during the compressing. The cooled primary product gas is channeled through a check valve 116 and a pressure regulator 118 to a primary product outlet 120. The primary product outlet is interconnected with an oxygen reservoir 122 or other downstream equipment. A feedback line 124 supplies flush valve 82 with pure oxygen gas.

With continued reference to FIGS. 1A and 1B and further reference to FIG. 2, the first and second stages function asynchronously. That is, the cycling of the cross over valve assembly 20 need not be at the same times, the same periodicity, nor at the same repeat time as valve assembly 86. Rather, the two work independently. At a time $t_7$, the flush valve 82 connects the inlet port 80 with valve assembly 86. Valve 86a opens allowing the feed stock to be supplied to the first bed 90a. Valve 86d also opens allowing oxygen adsorbed in the second bed 90b in an earlier half cycle to be extracted by the low pressure means 92. The feed stock continues to be supplied to the first bed 90a until the sieve material is almost saturated with oxygen. When the pressure in bed 90a has reached a preselected operating pressure at $t_8$, the argon or secondary gas control valve 108 opens allowing argon gas which has passed through the first molecular sieve bed without being adsorbed to be discharged at the secondary gas output port 96. At time $t_7$, just before breakthrough, i.e. just before the molecular sieve material in bed 90a becomes saturated allowing feed stock to pass through the second end 94a, valves 86d and 108 close. The flush valve 82 connects the feedback path 104 with the valve assembly 86 and the product conservation valve 104 connects the second end 94a of the first bed with the first end 88b of the second bed. Because the second bed was pumped down to the low pressure of low pressure collection tank 110, the second bed 90b is at a lower pressure than the first bed 90a. By a time $t_{10}$, the fedback substantially pure oxygen has swept all of the feed stock and secondary product gas from the interstitial voids between particles of the molecular sieve material of the first bed 90a, as well as from all the plumbing and valves between flush valve 82 and the check valve 98a. At time $t_{10}$, valves 86a and 104 close. At time $t_{10}$, the molecular sieve material in the first bed 90a is saturated with adsorbed oxygen and the interstitial spaces of the first bed 90a are filled with pure oxygen.

It will be noted that the oxygen and argon gases that are pushed from the first bed 90a in the flushing process are not lost or discharged from the secondary product outlet 96. Rather, because the transfer valve 104 connects the two beds in series, the argon gas that passes through the first bed second end 94a before saturation and the oxygen and argon mixture that passes through the second end 94a after breakthrough are both passed through the inlet 88b into the second bed 90b where the oxygen is adsorbed. Likewise, any substantially pure oxygen that might be passed through the first bed 90a during flushing also passes into the second bed 90b for adsorption. Thus, by connecting the two beds in series with the bed that recently had the adsorbed oxygen extracted assures that all the primary product gas is adsorbed with none passing to the secondary gas outlet port. On the other hand, because the saturated bed has been also flushed of all argon, it contains substantially no argon to be extracted as primary product gas.

At time $t_{10}$ the cycle starts again, but with the beds reversed. It might be noted that because the second stage E is processing only about 20% of the volume of gas as the first stage D, it can either cycle more slowly, use smaller molecular sieve beds, or a combination of the two.

During the adsorption portion of the cycle as oxygen is adsorbed, the gas in the interstitial voids becomes disproportionately rich in argon. As the bed reaches saturation, the feed stock gas begins to displace the substantially pure argon interstitial gas. Due to diffusion, breakthrough of the feed stock into the secondary product stream is normally not sudden, but is evidenced by an increasing oxygen purity.

Preferably, the low pressure collection tank 110 is large relative to the volume of the beds 90a and 90b to allow the bed to blow down to a low but positive pressure with a minimum of back pressure.

The first stage D passes the primary product and adsorbs the secondary product; whereas, the second stage E adsorbs the primary product and passes the secondary product. The feed stock expulsion of the second stage E is different from the pressure equalization of the first stage D in that the feed stock expulsion prepares the bed contributing the pressure; whereas, the pressure equalization prepares the bed receiving the pressure. Unlike the pressure equalization technique, feed stock expulsion does not normally leave the beds in pressure equilibrium. Preferably, the contributing bed remains at about twice the pressure as the receiving bed. The purpose of the feed stock expulsion is cleansing, not pressurizing. By contrast, the pressure equalization in the first stage D is primarily concerned with efficiency. Pressure equalization minimizes the amount of compressive work that needs to be done by recovering pressure that would otherwise be exhausted. The purpose of feed stock expulsion of the second stage E is product purity. In feed stock expulsion, the primary product gas pushes feed stock out of the top of the bed being purified into the bottom of the other bed.

As an alternate embodiment, the feed stock expelled from the first bed of the second stage E need not go to another molecular sieve second bed. Rather, this material may be channeled to a holding tank or vessel until after the oxygen is extracted from the first bed. Material in the holding tank can then be returned to the inlet end of the first tank along with the feed stock at the commencement of the next cycle.

The initial product dispersal means B further includes a valve means 130 for selectively diverting the outlet of gas separator A to the surge tank 110 or to an exhaust port 132. The valve 130 is a relay controlled valve whose coil is controlled by a timer 134. The timer is connected with a switch 136 that determines when tank 122 is full such that it is reset each time the system is restarted. That is, when the pressure in tank 122 reaches the shut off pressure, compressor 112 is stopped, valve 82 is closed, and valve 86 stopped. When the pressure in tank 122 drops to the restart pressure, switch 136 closes and the timer 134 is reset as are Valves 82 and 86. The timer causes the valve 130 to change states such that primary product gas is directed to the outlet 132 until the timer 134 times out. In the preferred embodiment, the timer 134 is set for two complete cycles of the longer of the first and second stages. Alternately, the timer may be a counter which counts changes of state of the valve means 20 or 86 to measure a number of cycles performed. As yet another alternative, the diverter valve means 130 may be controlled by a primary product purity sensor disposed upstream from the valve 130. A pressure regulator valve 138 remains closed until the pressure of primary product gas generated by the separator A reaches a preselected minimum. The preselected minimum is higher than atmospheric pressure. In this manner, the pressure regulator valve 136 holds a minimum backpressure and assures unidirectional flow through outlet 132 Atmospheric air is prevented from being drawn into the system through diverter valve 130.

Figure 3:
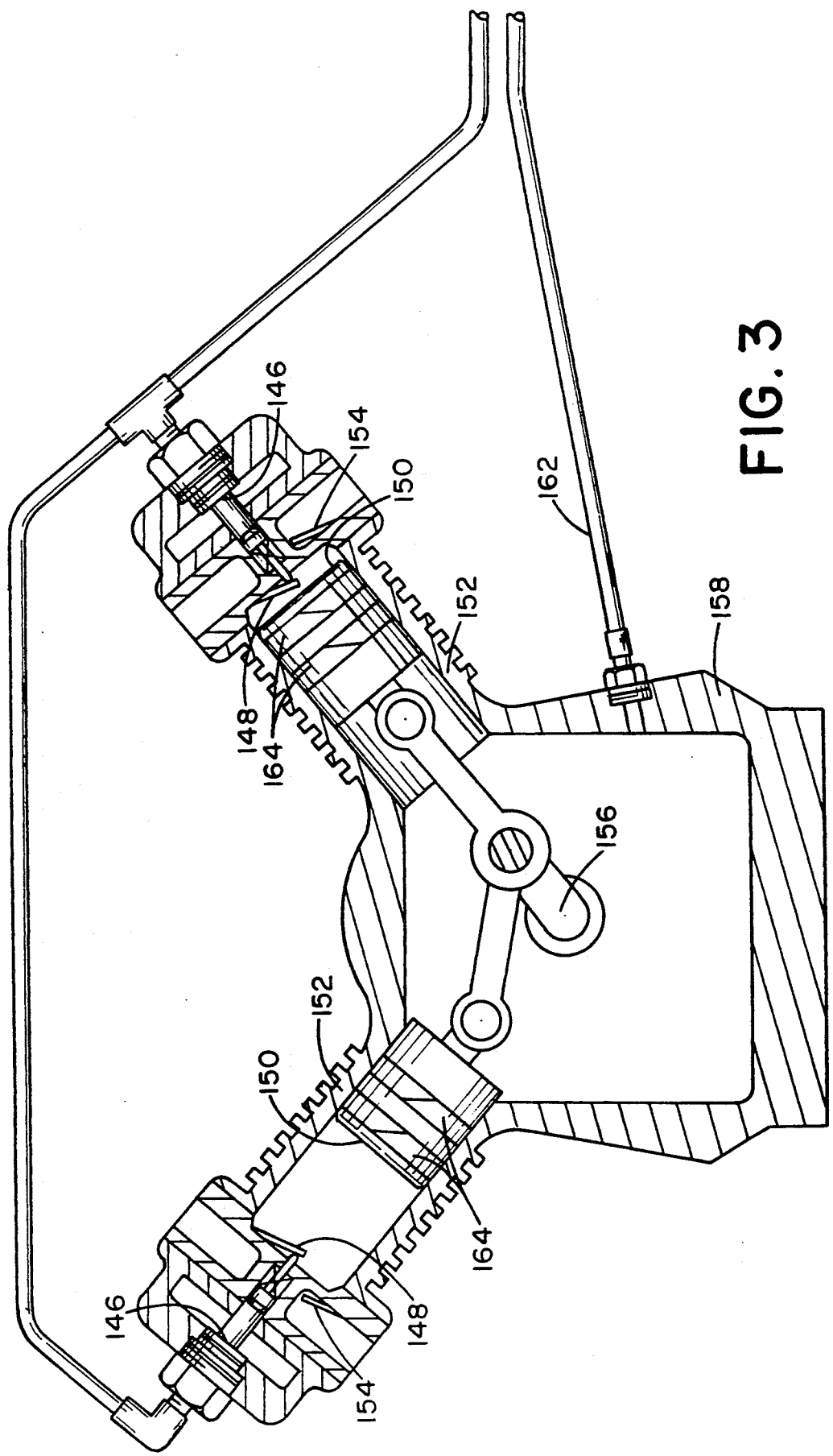
FIG. 3 is a cross-sectional view of the second compressor of FIG. 1.

With continuing reference to FIG. 1 and further reference to FIG. 3, once the diverter valve 130 closes, the pressure in the suction tank 110 begins to increase When the pressure reaches a preselected maximum, a suction tank drawdown pressure switch 140 changes state.

When the pressure drawdown switch 140 changes state, it causes a product inlet valve 142 to open passing the primary product gas from the suction tank 110 to the second compressor 112. Concurrently, the drawdown pressure switch causes a load/unload valve 144 to change states. The pressure load/unload valve 144 channels gas under pressure to and releases gas under pressure from loading/unloading cylinders 146. The loading/unloading cylinders 146 load and unload inlet valves 148 of the second compressor 112. When unloaded, valves 148 allow gas to be drawn in on the downstrokes of pistons 150 in cylinders 152. On the compression stroke, the gas is compressed and urged downstream through outlet valves 154. Preferably, a motor of the second compressor 112 rotates a crankshaft 156 continuously, causing the pistons to continue cycling However, the compressor 112 can only boost the gas pressure when the unloading cylinders load the valves 148. When unloaded, valves 148 are held open to prevent gas from being pushed downstream on the compression strokes.

The compressor 112 also includes a crankcase 158 which is sealed to the atmosphere. Primary product gas from the reservoir 122 is fed to a pressure regulator 160, through a crankcase pressurizing line 162, into the sealed crankcase 158. The pressure regulator 160 is set for a small, but positive pressure, sufficiently high to maintain the crankcase of the compressor 112 filled with primary product gas.

Preferably, the second compressor uses an oil-free design. Self-lubricating piston rings 164, such as Teflon rings, provide the bearing surface between the piston and the cylinder. Crankshaft bearings between the crankshaft 156 and the pistons and between a piston push rod and the pistons are permanently lubricated bearings which have been lubricated with an oxygen-resistant lubricant. In this manner, any gas which is drawn out of the crankcase on the downstroke of the piston is primary product gas. No air is drawn into the primary product stream through the crankcase.

During the initial boosting of the exhaust product, pressure is built in the heat exchanger 114 until it reaches the preset pressure of the back pressure maintaining pressure regulator valve 118. This back pressure supplies the load/unload valve 144 with pressurized product to unload the booster/compressor 112 pneumatically, when the drawdown pressure switch 140 deactivates.

Figure 4:
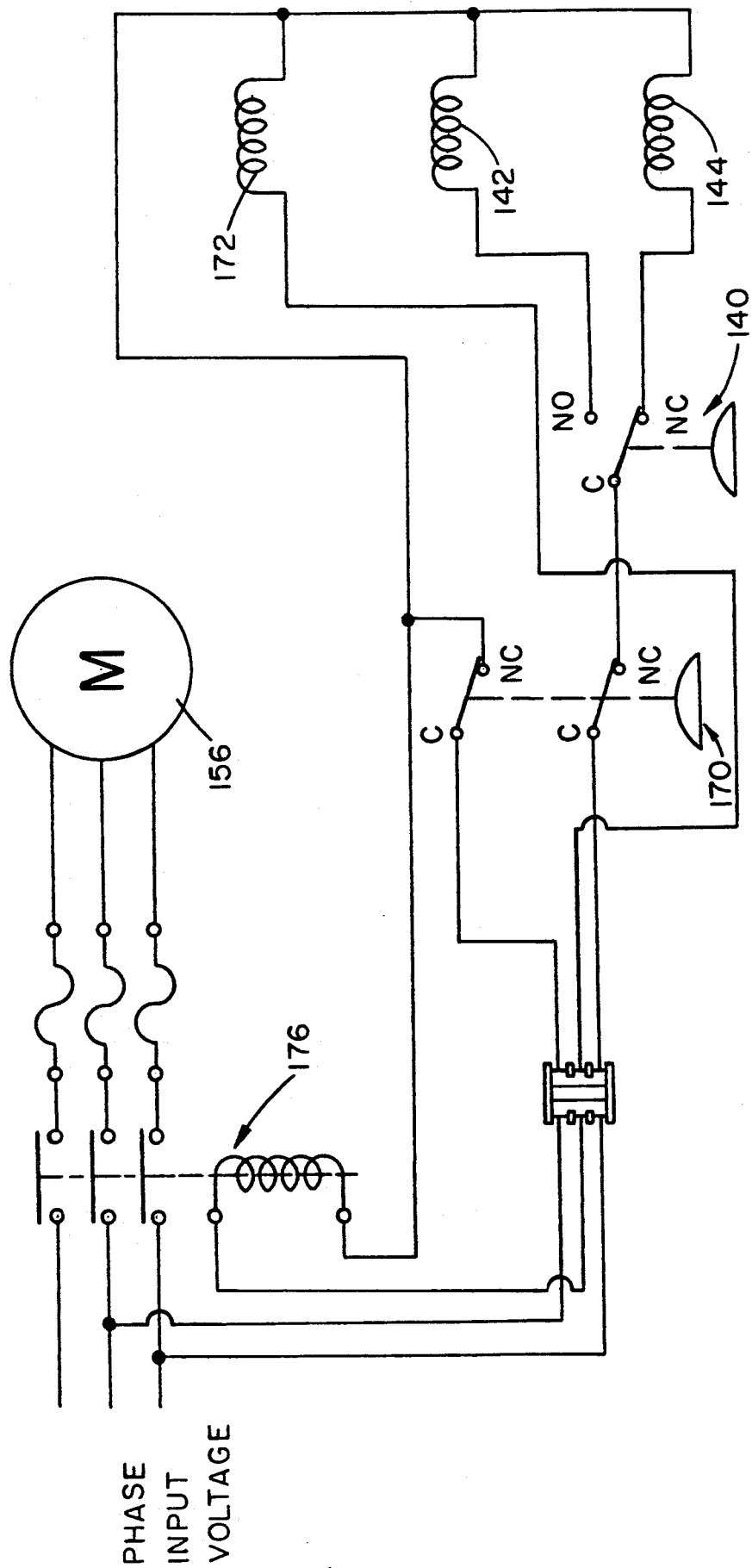
FIG. 4 is a schematic of a control circuit for controlling the system of FIG. 1.

With continuing reference to FIGS. 1A and 1B and further reference to FIG. 4, when the suction tank has been drawn down to the point where the drawdown pressure switch 140 deactivates, the product valve 142 closes and the load/unload valve 144 unloads the booster. The drawdown pressure switch 140 preferably deactivates at about 0.5 PSIG such that no vacuum is drawn on the gas separation system A. This prevents external gas from being drawn into the system by a vacuum.

The crankcase is pressurized with the primary product gas during both the load and unloaded operation. During the downstroke of the booster, a vacuum is drawn and crankcase gas is drawn in. The presence of the exhaust product gas in the crankcase prevents the intake of contaminants that would otherwise be present. In the preferred embodiment, the crankcase is maintained at a pressure of about 3 PSIG by the pressure regulator 160.

A high pressure shutdown valve 170 prevents overpressurization of the recovery system. Preferably, the gas separating means A is designed to shutdown when a slightly lower preselected pressure is reached indicating that no more oxygen is called for. When for some reason primary product continues to be applied and the pressure exceeds the pressure shutdown limit, the high pressure shutdown switch 170 changes states causing a dump valve 172 to be deactivated and open. A check valve 174 assures that the dump valve 172 only dumps excess pressure and does not function as an access port for air or other contaminating gases. When the high pressure shutdown switch 140 changes states, it removes power from the primary product inlet valve 142 and the load/unload valve 144 which terminates the supply of oxygen to the booster/compressor 112 and unloads the booster/compressor such that it stops compressing. Moreover, the state change of the high pressure shutdown switch releases a magnetic starter switch 176 which cuts the supply of power to the booster/compressor motor. A product relief valve 178 is set to release product pressure at a yet higher pressure than the high pressure shutdown switch to provide a sure limiting of the pressure in the supply system should the high pressure shutdown switch malfunction.

It will be noted that when power is lost, the motor 154 of the booster/compressor 112 stops, the product valve 142 closes, the load/unload valve 144 causes cylinders 146 to load the compressor 112 which is stopped so the compressor next restarts under load, and the pressure dump valve 172 opens.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of generating primary product gas comprising:

selectively separating a primary product gas from a gaseous mixture;

boosting a pressure of the primary product gas with a piston type compressor to supply the primary product gas at a second pressure, the piston type compressor inherently having leakage between a piston and cylinder wall such that gases are drawn from a crankcase thereof and intermixed with the primary product gas;

maintaining the crankcase at least adjacent the piston and cylinder wall charged with the primary product gas such that the gas which is drawn between the piston and cylinder is primary product gas and does not dilute the primary product gas supplied at the second pressure.

2. A method of producing a primary product gas, the method comprising:

supplying a gaseous mixture on demand to a pressure swing adsorption gas separating means which separates the primary product gas from the gaseous mixture, the supply of the gaseous mixture under pressure starting and stopping, as necessary, to meet downstream demand, each time the supplying of the gaseous mixture is restarted, the separated primary product gas having a reduced purity;

diverting the primary product gas of reduced purity such that the reduced purity primary product gas is not supplied downstream;

boosting a pressure of the primary product gas supplied downstream with a piston type compressor to a higher pressure, the piston type compressor inherently having leakage between a piston and cylinder wall such that gases are drawn from a crankcase thereof and intermixed with the primary product gas;

maintaining the crankcase at least adjacent the piston and cylinder wall charged with the primary product gas such that the gas which is drawn between the piston and cylinder is primary product gas and does not dilute the primary product gas supplied at the second pressure.

3. A pressure swing absorption gas separation system comprising:

a first compressor means for compressing a gaseous mixture;

a molecular sieve bed means that holds a molecular sieve medium which adsorbs a first gaseous component of the gaseous mixture and passes a second gaseous component of the gaseous mixture;

a valving means for selectively channeling the compressed gaseous mixture to the molecular sieve bed means for alternately causing (i) the gaseous mixture to be supplied to the molecular sieve medium such that the first gaseous component is adsorbed and the second gaseous component is passed and (ii) causing the adsorbed second gaseous component to be desorbed;

a primary product gas output in fluid communication with the molecular sieve bed means for supplying a selected one of the first and second gaseous components as a primary product gas;

a piston pump type compressor connected in fluid communication with the primary product gas output, which second compressor means includes:

a cylinder block which is connected at one end with an inlet valve means through which primary product gas is received from the primary product gas output and an outlet valve means through which primary product gas is discharged downstream at a higher pressure and which cylinder block is connected with a sealed crankcase chamber, a piston mounted for reciprocal motion in the cylinder such that the primary product gas is drawn in through the inlet valve means on a draw stroke and pushed out through the outlet valve means on a compression stroke;

a crankcase pressurizing means for conveying primary product gas into the sealed crankcase chamber, whereby any gas drawn between the piston and the cylinder block on the intake stroke is primary product gas and does not dilute the purity of the primary product gas discharged through the outlet valve means.

4. The system as set forth in claim 3 further including:

a suction tank connected between the piston pump compressor and the primary product gas output;

a pressure sensing means for sensing a pressure in the suction tank, the pressure sensing means controlling the piston pump compressor for causing the pressure in the suction tank to be maintained generally in a preselected pressure range.

5. The system as set forth in claim 4, further including a loading/unloading valve means operatively connected with the piston pump compressor outlet valve means for receiving primary product gas under pressure therefrom and selectively supplying the primary product gas under pressure to a means for selectively disabling at least one of the piston pump compressor inlet and outlet valve means such that reciprocation of the piston does not compress the primary product gas, the loading/unloading valve means being operatively connected with the pressure sensing means such that the at least one of the inlet and outlet valve means are selectively enabled and disabled as necessary to enable the piston pump type compressor means to maintain the suction tank in a preselected pressure range.

6. The system as set forth in claim 5 further including a heat exchanger mounted between the loading and unloading valve means and the piston pump compressor outlet valve.

7. The system as set forth in claim 3 further including a pressure regulator means for regulating pressure of the primary product gas conveyed to the sealed crankcase chamber.

8. The system as set forth in claim 7 further including a primary product tank connected downstream from the compressor outlet valve means for storing primary product gas under pressure, the crankcase pressurizing means being connected in fluid communication with the primary product tank.

9. The system as set forth in claim 3 further including:

a primary product tank connected in fluid communication with the compressor outlet valve means for receiving and storing primary product gas under pressure;

a primary product tank pressure monitoring means for monitoring a pressure of primary product gas in the primary product tank, the primary product tank pressure monitoring means being operatively connected with the first compressor means for selectively terminating the supply of the compressed gaseous mixture to the molecular sieve bed means.

10. The system as set forth in claim 9 further including:

a diverter valve means operatively connected with the primary product outlet for selectively connecting the primary product outlet (i) with the piston pump compressor and (ii) with a vent port;

a diverter valve control means for controlling the diverter valve such that the diverter valve diverts the primary product gas to the vent port in response to restarting the system, whereby less pure primary product gas associated with restarting the system is diverted to the vent port rather than supplied to the piston pump compressor and lowering the purity of the primary product gas in the primary product tank.

11. The system as set forth in claim 10 further including a means disposed between the diverter valve means and the vent port for assuring unidirectional flow of gas from the diverter valve to the vent port, whereby contaminant gas is prevented from flowing from the vent port into the system through the diverter valve means.

12. A pressure swing adsorption gas separation system comprising:

a first compressor means for compressing air;

a first molecular sieve bed means that holds a first molecular sieve medium which absorbs at least one gaseous component of the air and passes a mixture of gaseous components of the air;

a first valving means for selectively channeling the compressed air to the first molecular sieve bed means for alternately (i) causing the air to be supplied to the first molecular sieve medium such that the at least one gaseous component is adsorbed and the mixture of gaseous components is passed and (ii) causing the adsorbed at least one gaseous component to be desorbed;

a first output in fluid communication with the first molecular sieve bed means for supplying the mixture of gaseous components;

a second molecular sieve bed means that holds a second molecular sieve medium that adsorbs a first component of the mixture of gaseous components and passes a second component of the mixture of gaseous components;

a second valving means for selectively channelling the mixture of gaseous components to the second molecular sieve bed means for alternately (i) causing the mixture to be supplied to the second molecular sieve medium such that the first component is adsorbed and the second component is passed and (ii) causing the adsorbed first component to be desorbed;

a second output in fluid communication with the second molecular sieve bed means for supplying a selected one of the first and second components;

a diverter valve means operatively connected with the second output for selectively supplying the selected one of the first and second components to (i) a port and (ii) a downstream primary product gas receiving means;

a diverter valve control means operatively connected with the diverter valve means for causing the diverter valve means to channel selected one of the first and second components to the port in response to starting of the system for a duration which is at least as long as a longer of a cycle of the first valve means and a cycle of the second valve means.

13. The system as set forth in claim 12 wherein the diverter valve control means is responsive to the first valving means and the second valving means for channelling the selected one of the first and second components to the vent port for twice the longer of a cycle time of the first valving means and twice the cycle time of the second valving means.

14. The system as set forth in claim 12 further including a second inverter valve means operatively connected with the first output for selectively supplying the mixture of gaseous components to one of (i) a port and (ii) the second valving means, the diverter valve control means controlling the second diverter valve means for causing the second diverter valve means to channel the mixture of gaseous components to the vent port in response to starting of the system.

15. A pressure swing adsorption gas separation system comprising:
  a first compressor means for compressing a gaseous mixture;
  a molecular sieve bed means that holds a molecular sieve medium which adsorbs a first gaseous component of the gaseous mixture and passes a second gaseous component of the gaseous mixture;
  a valving means for selectively channeling the compressed gaseous mixture to the molecular sieve bed means for alternately (i) causing the gaseous mixture to be supplied to the molecular sieve medium such that the first gaseous component is adsorbed and the second gaseous component is passed and (ii) causing the adsorbed second gaseous component to be desorbed;
  a primary product output in fluid communication with the molecular sieve bed means for supplying a selected one of the first and second gaseous components as a primary product gas;
  a suction tank for drawing the primary product gas thereinto;
  a second compressor means operatively connected with the suction tank for maintaining the suction tank substantially in a preselected pressure range;
  a diverter valve means operatively connected with the primary product output for selectively connecting the primary product output with (i) an outlet and (ii) the suction tank;
  a diverter valve control means operatively connected with the diverter valve means for causing the diverter valve means to channel primary product gas to the outlet in response to starting of the system.

16. The system as set forth in claim 15 further including:
  a primary product reservoir connected with the second compressor means for storing primary product gas at an elevated pressure;
  a means for controlling the first compressor means to start and stop compressing the gaseous mixture in response to pressure in the primary product reservoir such that the production of primary product gas is suspended in response to the primary product reservoir reaching a preselected state of fill.

17. A gas system comprising:
  a means for supplying a primary product gas at a first relatively low pressure;
  a piston type compressor for compressing the primary product gas to a second, higher pressure, the piston type compressor including a sealed crankcase chamber from which gas escapes between a piston and a cylinder wall during a suction stroke of the piston;
  means for supplying the primary product gas to the sealed crankcase chamber to maintain the crankcase chamber filled with primary product gas such that nay gas which escapes from the sealed crankcase chamber between the piston and the cylinder wall is primary product gas, whereby a purity of primary product gas supplied at the second, higher pressure by the piston type compressor is maintained.

* * * * *